United States Patent
Jain et al.

(10) Patent No.: US 10,083,556 B1
(45) Date of Patent: Sep. 25, 2018

(54) INTELLIGENT ACCESS SYSTEM AND METHOD FOR A VEHICLE

(71) Applicant: Robert Bosch GmbH, Stuttgart (DE)

(72) Inventors: Vivek Jain, Sunnyvale, CA (US);
Maurizio Bocca, Sunnyvale, CA (US);
Huang Lee, Palo Alto, CA (US);
Christoph Lang, Sunnyvale, CA (US);
Abtin Keshavarzian, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/461,111

(22) Filed: Mar. 16, 2017

(51) Int. Cl.
*G07C 9/00* (2006.01)
*B60W 50/08* (2012.01)

(52) U.S. Cl.
CPC ......... *G07C 9/00111* (2013.01); *B60W 50/08* (2013.01); *G07C 9/00071* (2013.01); *G07C 9/00309* (2013.01); *G07C 2009/00793* (2013.01)

(58) Field of Classification Search
CPC ............ G07C 9/00111; G07C 9/00071; G07C 9/00309; G07C 2009/00793; B60W 50/08
See application file for complete search history.

(56) References Cited

U.S. PATENT DOCUMENTS

| | | | |
|---|---|---|---|
| 2006/0091997 A1* | 5/2006 | Conner | B60R 25/1003 340/5.64 |
| 2006/0255911 A1* | 11/2006 | Taki | B60R 25/24 340/5.72 |
| 2013/0076484 A1* | 3/2013 | Nishiguchi | G07C 9/00309 340/5.64 |
| 2013/0151111 A1* | 6/2013 | Skelton | B60R 25/00 701/99 |
| 2015/0310681 A1* | 10/2015 | Avery | G07C 9/00119 340/5.61 |
| 2016/0320469 A1* | 11/2016 | Laifenfeld | G01S 5/0284 |
| 2017/0101110 A1* | 4/2017 | Yoo | B60W 10/18 |
| 2018/0018179 A1* | 1/2018 | Scheufler | B60R 16/037 |
| 2018/0053360 A1* | 2/2018 | Jergess | G07C 9/00007 |

* cited by examiner

*Primary Examiner* — Thomas Alunkal
(74) *Attorney, Agent, or Firm* — Maginot Moore & Beck LLP

(57) ABSTRACT

A vehicle access control system configured to estimate, based on received message, at least one of distance, position, or direction of a target to the vehicle prior to initiating the engine of the vehicle, the vehicle access control system comprises a master node and at least one slave node. The target is in communication with the master node and the slave node via a communication link having low energy consumption.

23 Claims, 6 Drawing Sheets

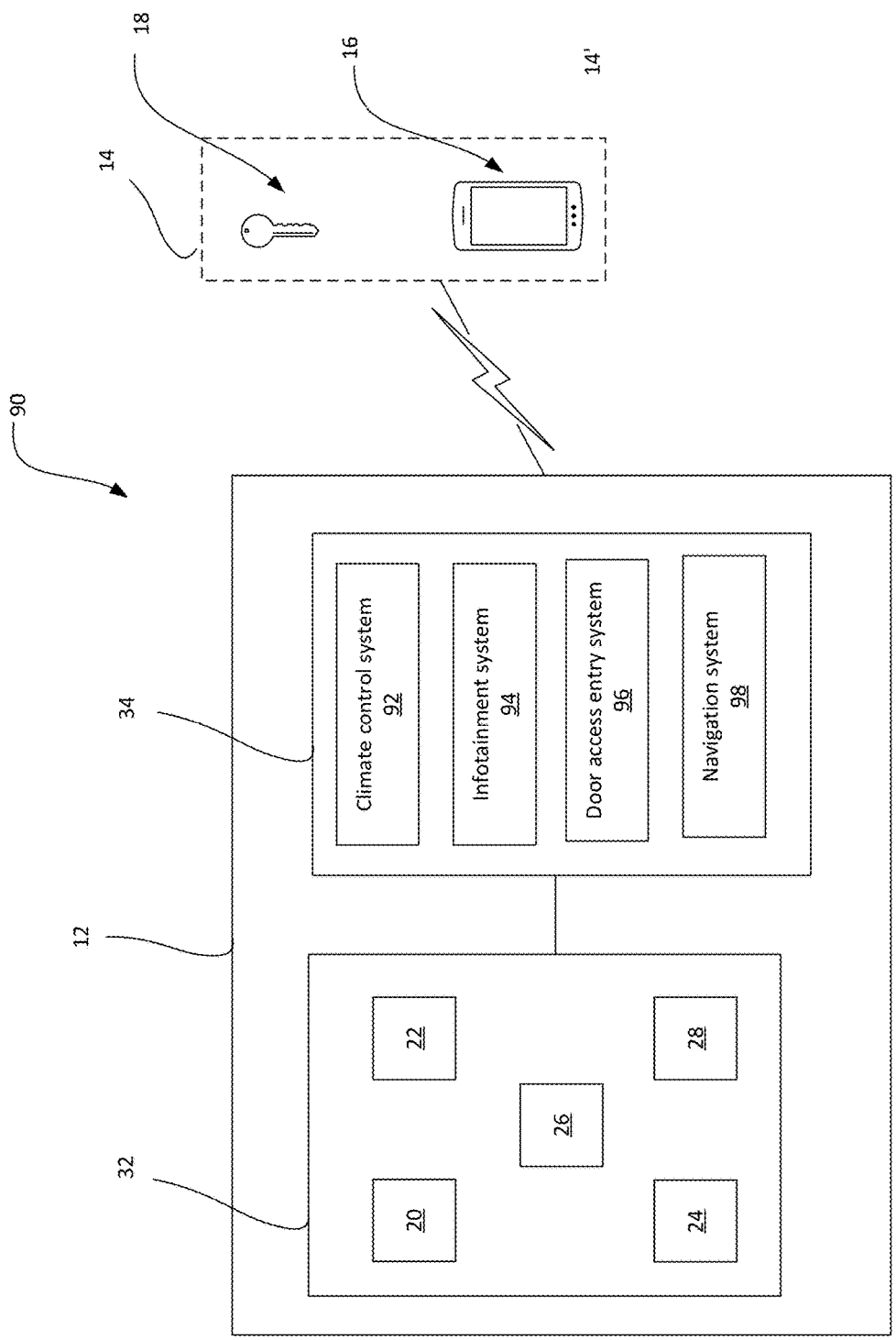

INTELLIGENT ACCESS SYSTEM AND METHOD FOR A VEHICLE

FIELD

This disclosure relates generally to keyfob systems and, more particularly, to intelligent access system and method for a vehicle.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the disclosure related to intelligent access systems and methods for vehicle. One such system may include a target and a vehicle having a slave sensing node for communicating with the target and a controller of the vehicle in communication with the slave sensing. The slave sensing node is configured to receive a packet from the target, determine an information for the packet, and transmit a message to the controller comprising the information and the beacon packet for the target. The controller is configured to estimate, based on received message, at least one of distance, position, or direction of the vehicle user to the vehicle prior to initiating the engine of the vehicle. The controller is configured to perform at least one Passive Entry Passive Start (PEPS) function at the vehicle when the target is within a range of authorization. The target is selected from a group consisting of a key fob, a wearable device, a portable device, a phablet, a personal digital assistant, and a device having Bluetooth communication protocol. The controller of the vehicle is further in communication with the target. The controller is configured to detect a vicinity of the target, at least in part, inside the vehicle or outside the vehicle. The controller is further configured to generate an event responsive, at least in part, to detection an event internal of the vehicle, and wherein the event responsive comprising at least one of (a) indicates RF pattern of an object internal of the vehicle, (b) indicates an image of the object internal of the vehicle, (c) indicates an acoustic signal pattern of the object internal of the vehicle, and (d) indicates a biometric information of the object internal of the vehicle. The indication comprises a distortion provided, at least in part, responsive to the RF patterns detected by a master sensing node of the vehicle. The indication comprises a change in RF patterns detected by a master sensing node of the vehicle. The indication is provided, at least in part, responsive to an imaging data captured by an imaging sensor. The indication is provided, at least in part, responsive to an acoustic data recorded by a transducer. The indication is provided, at least in part, responsive to a biometric data captured by a biometric device. The controller is further configured to transmit an alert in response to the event responsive indicating a presence of at least one of an occupancy and an intrusion. The controller is further configured to control an access entry device of the vehicle by either granting access to the vehicle user when the vehicle user is within a range of authorization or denying access to the vehicle user when the vehicle user is outside a range of authorization. At least one of an accelerometer and a gyroscope of the target in communication with the controller, the controller is configured to receive data from the accelerometer defining a first gesture identifier and control the access entry device of the vehicle to unlock a door of the vehicle if the vehicle user is within a range of authorization corresponds to the first gesture identifier. In another embodiment, at least one of an accelerometer and a gyroscope of the target in communication with the controller, the controller is configured to receive data from the accelerometer defining a second gesture identifier and control the access entry device of the vehicle to lock a door of the vehicle if the vehicle user is outside a range of authorization corresponds to the second gesture identifier. A second target in communicating with the target and the controller. The target is configured to receive a requested schedule time from the second target to pick up the vehicle and transmit a temporary key having a trigger message to the second target and the controller. The second target provides sensor output data representative of a location of the second target. The temporary key is automatically removed from the second target based on, at least in part, (a) the sensor output data, (b) a travel distance to the vehicle, (c) a travel time to the vehicle, and (d) an arrival time to the vehicle is either exceeding the requested schedule time or the second target is out of a geo-fence of the vehicle. The temporary key is automatically removed from the controller, the controller denying the second target an access to the vehicle. A second target in communicating with the target and the controller is configured to receive a request associated with a share event of the vehicle from the second target, the request including a date and time at which the share event to be occurred and transmit a temporary key having a trigger message to the second target and the controller. The second target provides sensor output data representative of a location of the second target. The temporary key is automatically destructed from the second target based on, at least in part, (a) the sensor output data and (b) the share event is either exceeding the request or the second target is out a geo-fence of the vehicle. The temporary key is automatically removed from the controller, the controller denying the second target an access to the vehicle.

According to another aspect of the disclosure, there is provided a system comprises a target and a vehicle having a plurality of sensing nodes for communicating with the target having a master node and at least one slave node. The slave node is configured to receive a packet from the target, determine information for the packet, and transmit a message to the master node comprising the information and the packet for the target. The master node is configured to estimate, based on received message, at least one of distance, position, or direction of the vehicle user to the vehicle prior to actuating the engine of the vehicle. The master node is configured to perform at least one Passive Entry Passive Start (PEPS) function at the vehicle when the target is within a range of authorization. The target is selected from a group consisting of a key fob, a wearable device, a portable device, a phablet, a personal digital assistant, and a device having Bluetooth communication protocol.

BRIEF DESCRIPTION OF THE DRAWINGS

These and other features, aspects, and advantages of this disclosure will become better understood when the following detailed description of certain exemplary embodiments is read with reference to the accompanying drawings in which like characters represent like arts throughout the drawings, wherein:

FIG. 5 is a simplified schematic representation of a vehicle incorporating an event system.

DETAILED DESCRIPTION

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

Figure 1:
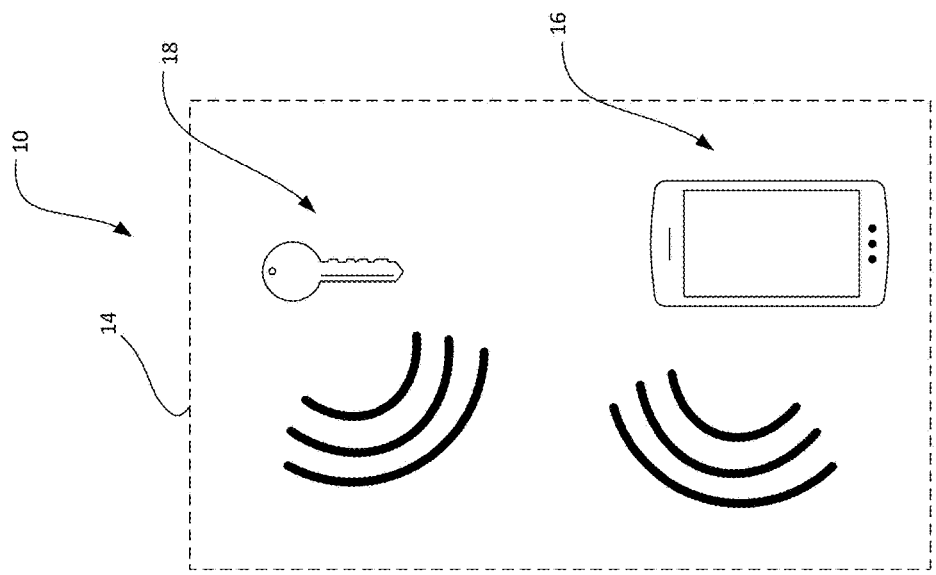
FIG. 1 is an illustration of a system on a vehicle that employs one or more node.
Figure 1:
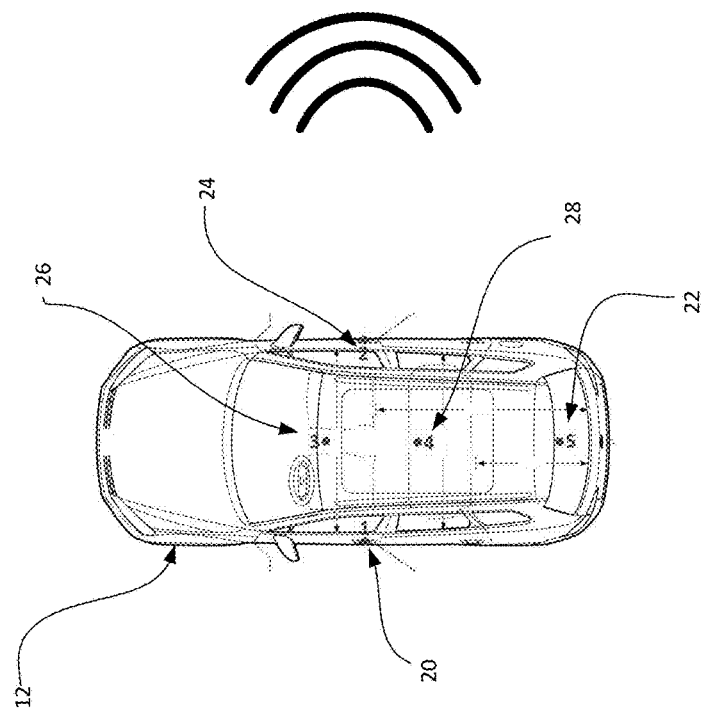

FIG. 1 illustrates a system 10 in accordance with a disclosure. The system 10 generally includes a vehicle 12 and a target 14 communicatively coupled to the vehicle 12 via a communication link. The system can be a passive vehicle access control, a remote key entry system, etc. Other contemplated vehicle systems include an access control, a key access, an entry control, a gesture control, and a gesture access. As illustrated, the communication link is a Bluetooth (BT) communication protocol and standard that includes a Bluetooth Low Energy (BLE) communication protocol. Other contemplated communication protocol includes low energy/power consumption. The target 14 may be key/card devices, client devices, BLE-enabled devices, and communication protocol with low energy/power consumption-enabled devices. The key/card device may be a key fob, key card, a client device, an access key, an access card, a smart card, and a smart key. The client device may be a smart phone, a personal digital assistant (PDA), a tablet, a laptop, a portable personal computer, a phablet, a wearable device, a thin device, a thick device, an entertainment device, and an infotainment device. As illustrated, the key/card device is a smart key 18 and the client device is a phablet 16. A plurality of wireless nodes 20, 22, 24, 26, 28 having integrated antenna can be installed at various locations in and around the vehicle 12. In one embodiment, the antenna is a directional antenna. Depending on the application, other suitable antenna integrated into the nodes may be used in the system. Node 26 is positioned within the front end of the vehicle 12 at a particular location such as adjacent to a dashboard and can be functioned as remote key entry (RKE) node. Nodes 20, 22, 24, and 28 are positioned within the vehicle 12 at various particular locations of the vehicle 12 and can be functioned as passive entry passive start (PEPS) nodes. In one embodiment, the node 26 is operable to perform at least one Passive Entry Passive Start (PEPS) function at the vehicle when the target is within a range of authorization. For example, node 20 and 24 are installed near the handles of the front doors and node 22 is installed near the rear end of the vehicle. In one embodiment, the node 26 faces toward the inside of the vehicle while the rest of the node 20, 22, 24, and 28 face outwardly. Nodes 20, 22, 24, and 28 may be for instance slave sensing nodes for communicating with the target 14 and node 26 is the master node of the vehicle 12 in communication with one or more slave sensing nodes 20, 22, 24, and 28. Although five nodes are illustrated, any suitable number of nodes may be installed and positioned within the vehicle 12 without departing from the scope of the disclosure.

At least one or more nodes 20, 22, 24, 26, 28 periodically transmit any suitable number of packets to announce the presence of the vehicle 12 to the target 14, e.g. the smart key 18 or the phablet 16 carried by a driver or an authorized person of the vehicle 12. Other contemplated packets include beacon packets. The target 14 receives these beacon packets can initiate the connection and carry out an authentication process with the vehicle 12. In this process, the vehicle 12 and the target 14 continuously or repeatedly exchange data packets. For instance, the target 14 periodically transmits the beacon packets to either one or more nodes 20, 22, 24, 26, 28 or the vehicle access control/entry device that is coupled to the nodes 20, 22, 24, 26, 28. Once the connection between the vehicle 12 and the target 14 is authenticated, one or more nodes 20, 22, 24, 28 transmits the received information containing the beacon packets together with Received Signal Strength (RSS) value of the signal from the target 14 to the node 26. Other contemplated wireless channel physical parameter value other than RSS value includes channel state value, time of flight value, angle of arrival value, and phase shift value. The node 26 then estimates at least one perimeter such as distance, direction, and position of the smart key 18 or the phablet 16 from the received information. In alternate embodiment, one or more nodes 20, 22, 24, 26, 28 is configured to receive a beacon packet from the target 14, determine signal strength information of the signal from the target 14, and transmit a message to the controller having the signal strength information and the beacon packet of the target. The master node 26 comprises one or more controllers that is operable to execute instructions that are stored in a computer readable storage device or a computer readable medium, such as RAM, ROM, a solid state memory device, or a disk drive. The master node 26 is configured to estimate, based on received message, at least one of distance, position, or direction of the target 14 such as the vehicle user to the vehicle 12 prior to initiate the engine of the vehicle 12. In some embodiments, one or more controllers may be coupled to the master node 26.

Figure 2:
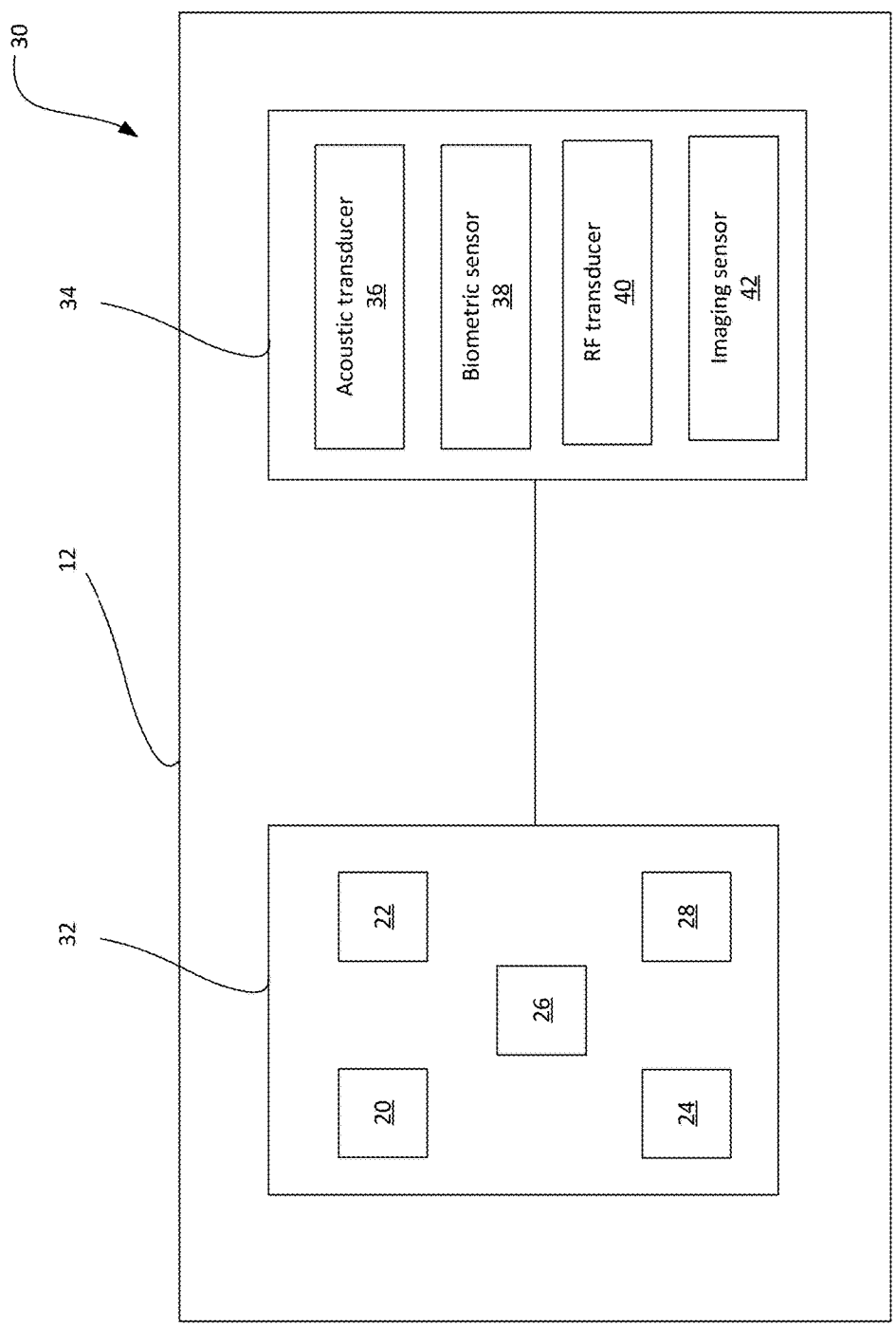
FIG. 2 is a simplified schematic representation of a vehicle incorporating an intrusion/occupancy system.

FIG. 2 is a simplified schematic representation of a vehicle 12 incorporating an intrusion or occupancy detection system 30 comprises a node assembly 32 including one or more nodes 20, 22, 24, 26, 28 that are similar to those nodes described above. The system 30 further comprises a transducer assembly 34 communicatively coupled to the node assembly 32. The transducer assembly 34 may include an acoustic transducer 36, a biometric sensor 38, a RF sensor 40, an imaging sensor, or the like. In one embodiment, the node 32 comprises one or more controllers that is operable and configured to generate an event responsive, at least in part, to detection an event internal of the vehicle, and wherein the event responsive comprising at least one of (a) indicates RF pattern of an object internal of the vehicle, (b) indicates an image of the object internal of the vehicle, (c) indicates an acoustic signal pattern of the object internal of the vehicle, and (d) indicates a biometric information of the object internal of the vehicle. In another embodiment, one or more controllers coupled to the node 32 is operable and configured to generate an event responsive, at least in part, to detection an event internal of the vehicle, and wherein the event responsive comprising at least one of (a) indicates RF pattern of an object internal of the vehicle, (b) indicates an image of the object internal of the vehicle, (c) indicates an acoustic signal pattern of the object internal of the vehicle, and (d) indicates a biometric information of the object internal of the vehicle. The indication comprises a distortion provided, at least in part, responsive to the RF patterns detected by at least one of a master sensing node 26, any sensing nodes 20, 22, 24, 28 of the node assembly 32 or the RF transducer 40 of the vehicle. The indication further comprises a change in RF patterns detected by at least one of a master sensing node 26, any sensing nodes 20, 22, 24, 28 of the node assembly 32 or the RF transducer 40 of the vehicle. In alternate embodiment, the indication is provided, at least in part, responsive to an imaging data captured by an imaging sensor. In further embodiment, the indication is provided, at least in part, responsive to an acoustic data recorded by a transducer. In still another embodiment, the indication is provided, at least in part, responsive to a biometric data captured by a biometric device.

In certain vehicle designs, the node 32 is configured to transmit an alert in response to the event responsive indicating a presence of at least one of an occupancy and an intrusion. In some embodiments, one or more controller coupled to the node 32 is configured to transmit an alert in response to the event responsive indicating a presence of at least one of an occupancy and an intrusion. Alternatively, either the node 32 comprises one or more controllers, or one or more controllers coupled to the node 32 is operable and configured to control an access entry device of the vehicle by either granting access to the vehicle user when the vehicle user is within a range of authorization or denying access to the vehicle user when the vehicle user is outside a range of authorization.

Figure 3A:
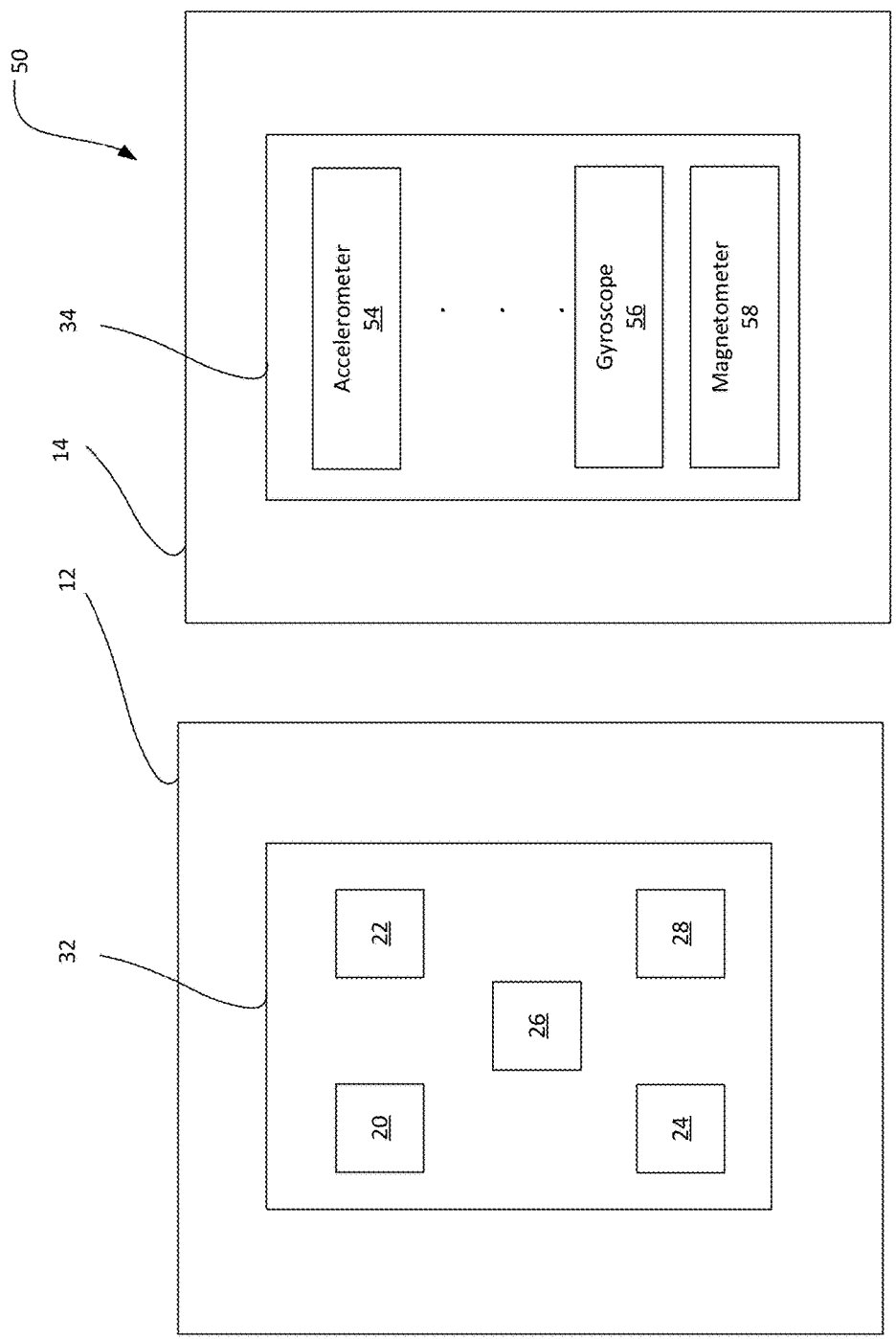
FIG. 3A is a simplified schematic representation of a vehicle incorporating a gesture access entry system.

FIG. 3A is a simplified schematic representation of a vehicle 12 incorporating a gesture access entry system 50 comprises a node assembly 32 having one or more nodes 20, 22, 24, 26, 28 which are similar to those nodes described above. The system 50 further comprises a transducer assembly 52 communicatively coupled to the node assembly 32. The transducer assembly 52 positioned in a target 14 includes at least one of an accelerometer 54, a gyroscope 56, and a magnetometer 58. The node 32 is configured to receive data from any transducer 54. 56. 58 of transducer assembly 52 that is defined as a first gesture identifier. The node is further configured to control the access entry device of the vehicle to unlock a door of the vehicle when the vehicle user is within a range of authorization corresponding to the first gesture identifier. In some embodiments, the node or the controller is configured to receive data from any transducer 54. 56. 58 of transducer assembly 52 that is defined as a second gesture identifier. The node or the controller is further configured to control the access entry device of the vehicle to lock a door of the vehicle if the vehicle user is outside a range of authorization corresponding to the second gesture identifier. The first and second gesture identifiers may be still or moving gesture performed by the user either holding, carrying, or wearing the target 14.

Figure 3B:
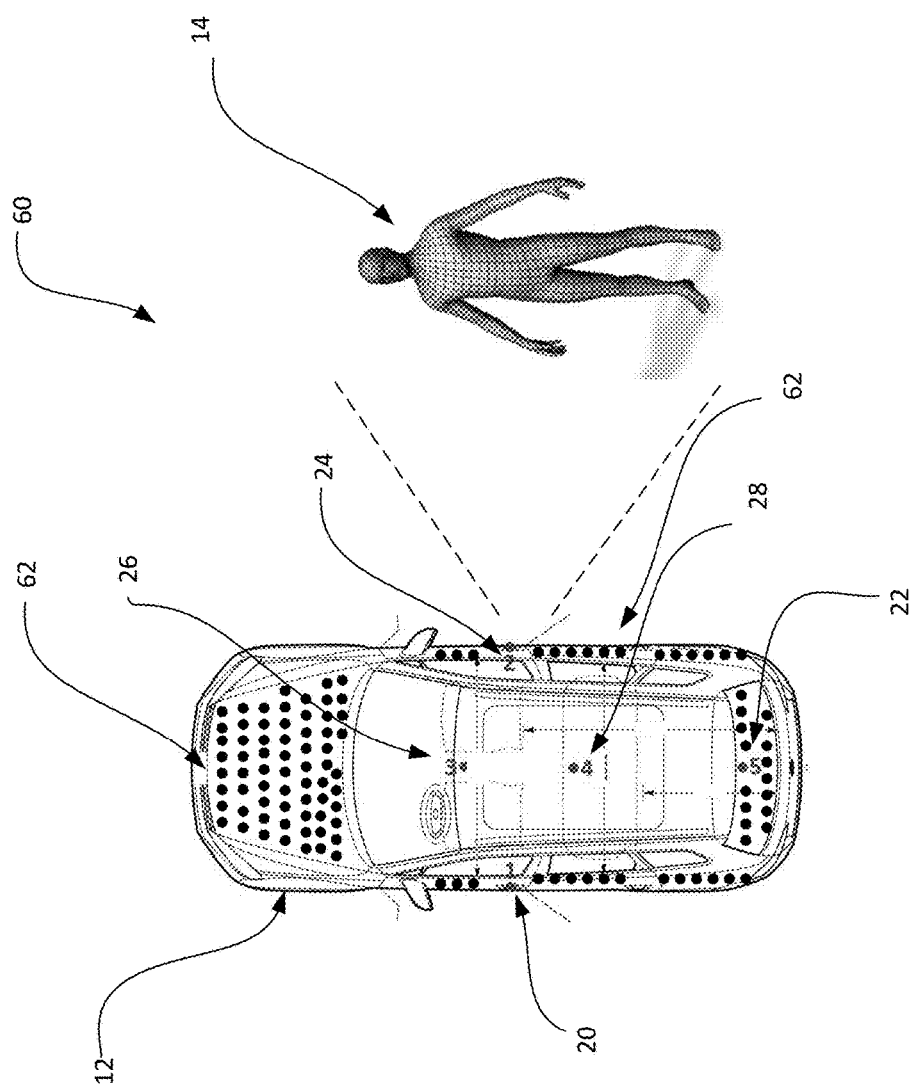
FIG. 3B is another simplified schematic representation of a vehicle incorporating a gesture access entry system.

FIG. 3B is another simplified schematic representation of a vehicle 12 incorporating a gesture access entry system 60 comprises a node assembly 32 having one or more nodes 20, 22, 24, 26, 28 which are similar to those nodes described above. The system 60 further comprises a gesture recognition/scanning device 62 in communication with the node assembly 32. The gesture recognition/scanning device 62 incorporated into a body of the vehicle 12 comprises a matrix of micro-sensors or micro-scanners, moveable between an angle that detects moving targets and another angle that detects still targets. The node 32 is configured to receive data from the gesture recognition/scanning device 62 that is defined as a first gesture identifier. The node is further configured to control the access entry device of the vehicle to unlock a door of the vehicle when the first gesture identifier matches a gesture stored in a gesture library or a memory. In some embodiments, the node or the controller is configured to receive data from the gesture recognition/scanning device 62 that is defined as a second gesture identifier. The node or the controller is further configured to control the access entry device of the vehicle to lock a door of the vehicle when the second gesture identifier does not match with the gesture stored in the gesture library or the memory. The first gesture identifier may be an image gesture performed by the vehicle driver or the authorized user. The second gesture identifier may be an image gesture performed by an unauthorized user. In one embodiment, the image gesture may be a still image of a physical characteristic. In another embodiment, the image gesture may be moving image gesture. In yet another embodiment, the image gesture may be a changing/transitioning image gesture. Other contemplated image gestures include hand gesture, face gesture, eye gesture, body gesture, or combination thereof.

In certain vehicle designs, when the node assembly 32 detects the vehicle user or the authorized user is within a range of authorization, the node 32 waits up the gesture recognition/scanning device 62 to scan or capture the user image gesture what is defined as a first gesture identifier. Once the user image gesture is scanned or captured, the node assembly 32 controls the access entry device of the vehicle to either unlock or lock the door of the vehicle when the second gesture identifier matches and corresponds with the gesture stored in the gesture library or the memory.

Figure 4:
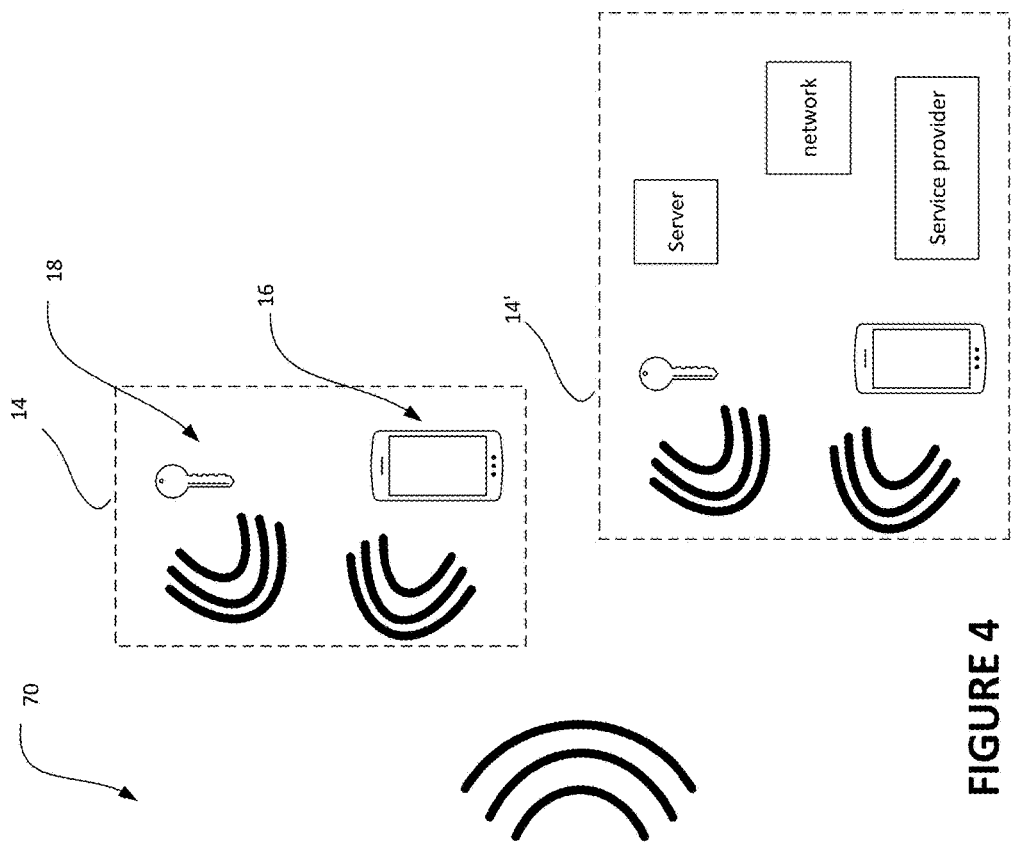
FIG. 4 is a simplified schematic representation of a vehicle incorporating a virtual key sharing system.
Figure 4:
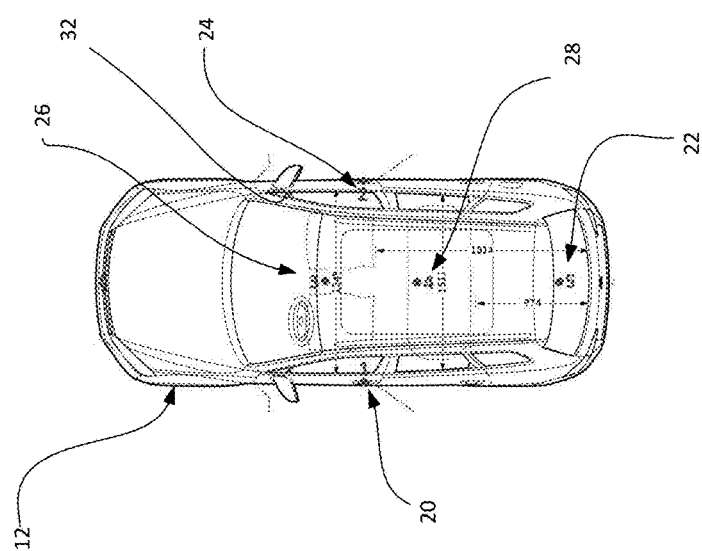

FIG. 4 is a simplified schematic representation of a vehicle incorporating a virtual key sharing system 70. A second target 14' is in communicating with the first target 14 and the vehicle 12. The first target 14 is configured to receive a requested schedule time from the second target 14' to pick up the vehicle 12 and transmit a temporary key having a trigger message to the second target and at least one of the node or the controller. The second target 14' is identical to the first target 14 as described in FIG. 1. Other contemplated second target 14' includes a server, a network, or a service provider. The second target 14' provides sensor output data representative of a location of the second target. The temporary key is automatically removed from the second target 14' based on, at least in part, (a) the sensor output data, (b) a travel distance to the vehicle, (c) a travel time to the vehicle, and (d) an arrival time to the vehicle is either exceeding the requested schedule time or the second target is out of a geo-fence of the vehicle. In alternate embodiment, the temporary key is automatically removed from the controller, the controller denying the second target an access to the vehicle.

In certain vehicle designs, one or more targets 14' are in communication with the other target and the vehicle 12 are provided. The first target 14 is configured to receive a request associated with a share event of the vehicle from one or more targets 14', the request including a date and time at which the share event to be occurred and transmit a temporary key having a trigger message to one or more targets 14' and vehicle. One or more targets 14' provides sensor output data representative of a location of one or more targets 14'. In one embodiment, the temporary key is automatically destructed from one or more targets 14' based on, at least in part, (a) the sensor output data and (b) the share event is either exceeding the request or the second target is out a geo-fence of the vehicle. In another embodiment, the temporary key is automatically removed from the vehicle, the vehicle denying the second target an access to the vehicle. In one embodiment, the node 32 or the controller receives the request and the temporary key from the target 14 or 14', automatically destructs the temporary key, and denies access to the target 14 or 14'.

FIG. 5 is a simplified schematic representation of a vehicle incorporating an event system 90 communicatively coupled to a system that is identical to the system 10 of FIG. 1. An interface of a vehicle for communicating with a vehicle user and a controller of the vehicle in communication with the interface are provided. In some embodiments, the interface may be integrated into the controller. The controller is operable to connect to a thin device carried by or worn by the vehicle user responsive to the vehicle user approaching the vehicle, retrieve data associated with a calendar event from the thin device, when the vehicle user is within a range of authorization for exchanging data over a data channel with the thin device, the data including a destination location and a time at which the calendar event occurs and display the destination location and the time to the vehicle user. An optional training module in communication with at least one of the interface or the controller may be provided. The training module is operable to control at least one of a vehicle device such as a climate weather device, an infotainment device, a door access entry system, a navigation system, or the like, based on a perimeter such as an event, a routine, regular or day activity performed by the vehicle user stored in a memory. The controller or the node including one or more controllers is operable to perform at least one Passive Entry Passive Start (PEPS) function at the vehicle when the vehicle user is within a range of authorization. The vehicle 12 further includes one or more sensing system such as a camera system, a system operating at 20 kHz, a LIDAR, an ultrasound sensor, a thermal sensor, an optical sensor, an ultrasonic sensor, or the like. The controller is further configured to turn on the sensing system when an obstacle around the vehicle is detected. In some embodiments, the controller is configured to prompt the interface to determine any obstacle around the vehicle and turn on the camera system responsive to the location of the obstacle. The camera system may include a front end camera and a rear end camera positioned within the vehicle 12. The controller controlling the camera system turn on at least one of a front end camera and a rear end camera of the camera system responsive to the location of the obstacle.

In certain vehicle designs, the controller is further configured to retrieve weather information, turn on a climate control system of the vehicle, and set the climate control system if either cooling or heating is required based on the retrieved weather information. In another embodiment, the controller is configured to retrieve vehicle user profile from the thin client, identify vehicle user preference based on prior recorded vehicle user control inputs, and control a climate control system to achieve user comfort responsive to the vehicle user preference. In yet another embodiment, the controller is configured to retrieve vehicle user profile from the thin client, identify vehicle user preference based on prior recorded vehicle user control inputs, and control an infotainment system to achieve user comfort responsive to the vehicle user preference.

Another aspect of the disclosure, any system described above in FIGS. 1-5 may include a tracking device and the tracking device is operable to track the target and estimate the perimeter such as distance, a position, or direction of the target to a vehicle.

Another aspect of the disclosure, any system described above in FIGS. 1-5 may include a training device and the training device is operable to detect, monitor, forward, refuse access, or display and event such as a share event, a calendar event of the target.

Another aspect of the disclosure, any system described above in FIGS. 1-5 may include a training device and the training device is capable of controlling at least one of a vehicle device such as a climate weather device, an infotainment device, a door access entry system, a navigation system, or the like, based on a perimeter such as an event, a routine, regular or day activity performed by the vehicle user stored in a memory.

The embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling with the sprit and scope of this disclosure.

Embodiments within the scope of the disclosure may also include non-transitory computer-readable storage media or machine-readable medium for carrying or having computer-executable instructions or data structures stored thereon. Such non-transitory computer-readable storage media or machine-readable medium may be any available media that can be accessed by a general purpose or special purpose computer. By way of example, and not limitation, such non-transitory computer-readable storage media or machine-readable medium can comprise RAM, ROM, EEPROM, CD-ROM or other optical disk storage, magnetic disk storage or other magnetic storage devices, or any other medium which can be used to carry or store desired program code means in the form of computer-executable instructions or data structures. Combinations of the above should also be included within the scope of the non-transitory computer-readable storage media or machine-readable medium.

Embodiments may also be practiced in distributed computing environments where tasks are performed by local and remote processing devices that are linked (either by hard-wired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

While the patent has been described with reference to various embodiments, it will be understood that these embodiments are illustrative and that the scope of the disclosure is not limited to them. Many variations, modifications, additions, and improvements are possible. More generally, embodiments in accordance with the patent have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A system comprising:
a first target device; and
a vehicle comprising:
  a plurality of sensing nodes arranged at different locations on the vehicle and each having an antenna, the plurality of sensing nodes each being configured to communicate with the first target device, the plurality of sensing nodes each being configured to:
    receive a beacon packet from the first target device;
    determine signal strength information for the beacon packet; and
    transmit a message having the signal strength information and the beacon packet from the first target device; and
  a controller configured to communicate with the plurality of sensing nodes, the controller being configured to:
    receive the message from the plurality of sensing nodes;
    estimate, based on the received message, at least one of a distance, a position, and a direction of a vehicle user having the first target device with respect to the vehicle prior to initiating an engine of the vehicle;
    detect an event indicating a presence of at least one of an occupancy and an intrusion of the vehicle, at least in part, based on a distortion in RF patterns detected by the plurality of sensing nodes; and
    transmit an alert in response to the event indicating the presence of the at least one of the occupancy and the intrusion of the vehicle.

2. The system of claim 1, wherein the controller is configured to perform at least one Passive Entry Passive Start (PEPS) function at the vehicle when the first target device is within a range of authorization.

3. The system of claim 1, wherein the first target device is one of a key fob, a wearable device, a portable device, a phablet, a personal digital assistant, and a device having Bluetooth communication protocol.

4. The system of claim 1, wherein the controller is further configured to communicate with the first target device.

5. The system of claim 1, wherein the controller is configured to detect a vicinity of the first target device, at least in part, inside the vehicle or outside the vehicle.

6. The system of claim 4, wherein the controller is a master node with respect to the plurality of slave sensing nodes.

7. The system of claim 1, wherein the controller is further configured to detect the event, at least in part, based on an imaging data captured by an imaging sensor.

8. The system of claim 1, wherein controller is further configured to detect the event, at least in part, based on an acoustic data recorded by a transducer.

9. The system of claim 1, wherein controller is further configured to detect the event, at least in part, based on a biometric data captured by a biometric device.

10. The system of claim 1, wherein the controller is further configured to:
control an access entry device of the vehicle by either granting access to the vehicle user when the vehicle user is within a range of authorization or denying access to the vehicle user when the vehicle user is outside a range of authorization.

11. The system of claim 1, wherein the first target device includes a transducer assembly configured to communicate with the controller, the controller being configured to:
receive data from the transducer assembly defining a first gesture identifier; and
control the access entry device of the vehicle to unlock a door of the vehicle if the vehicle user is within a range of authorization corresponds to the first gesture identifier.

12. The system of claim 1, wherein the first target device includes a transducer assembly configured to communicate with the controller, the controller being configured to:
receive data from the transducer assembly defining a second gesture identifier; and
control the access entry device of the vehicle to lock a door of the vehicle if the vehicle user is outside a range of authorization corresponds to the second gesture identifier.

13. The system of claim 1 further comprising:
a second target device configured to communicate with the first target and the controller;
wherein the first target device is configured to:
  receive a requested schedule time from the second target device to pick up the vehicle; and
  transmit a temporary key having a trigger message to the second target device and the controller.

14. The system of claim 13, wherein the second target device is configured to provide sensor output data representative of a location of the second target device.

15. The system of claim 14, wherein the temporary key is automatically removed from the second target device based on, at least in part, (a) the sensor output data, (b) a travel distance to the vehicle, (c) a travel time to the vehicle, and (d) an arrival time to the vehicle is either exceeding the requested schedule time or the second target device is out of a geo-fence of the vehicle.

16. The system of claim 15, wherein the temporary key is automatically removed from the controller, the controller denying the second target device an access to the vehicle.

17. The system of claim 1 further comprising:
a second target device configured to communicate with the first target and the controller;
wherein the first target device is configured to:
  receive a request associated with a share event of the vehicle from the second target device, the request including a date and time at which the share event to be occurred; and
  transmit a temporary key having a trigger message to the second target device and the controller.

18. The system of claim 17, wherein the second target device is configured to provide sensor output data representative of a location of the second target device.

19. The system of claim 18, wherein the temporary key is automatically destructed from the second target device based on, at least in part, (a) the sensor output data and (b) the share event is either exceeding the request or the second target device is out a geo-fence of the vehicle.

20. The system of claim 19, wherein the temporary key is automatically removed from the controller, the controller denying the second target device an access to the vehicle.

21. A system comprising:
a first target device; and a vehicle comprising:
  a plurality of sensing nodes arranged at different locations on the vehicle and each having an antenna, the plurality of sensing nodes each being configured to communicate with the first target device, the plurality of sensing nodes having a master sensing node and at least one slave sensing node;
  wherein the at least one slave sensing node is configured to:
    receive a beacon packet from the first target device;
    determine signal strength information for the beacon packet; and
    transmit a message to the master node having the signal strength information and the beacon packet from the first target device; and
  wherein the master sensing node is configured to:
    receive the message from the plurality of sensing nodes;
    estimate, based on the message, at least one of a distance, a position, and a direction of a vehicle user having the first target device with respect to the vehicle prior to initiating an engine of the vehicle;
    detect an event indicating a presence of at least one of an occupancy and an intrusion of the vehicle, at least in part, based on a distortion in RF patterns detected by the plurality of sensing nodes; and
    transmit an alert in response to the event indicating the presence of the at least one of the occupancy and the intrusion of the vehicle.

22. The system of claim 21, wherein the master node is configured to perform at least one Passive Entry Passive Start (PEPS) function at the vehicle when the first target device is within a range of authorization.

23. The system of claim 22, wherein the first target device is one of a key fob, a wearable device, a portable device, a phablet, a personal digital assistant, and a device having Bluetooth communication protocol.

* * * * *